US008581162B2

(12) United States Patent
Campbell

(10) Patent No.: US 8,581,162 B2
(45) Date of Patent: Nov. 12, 2013

(54) WEIGHTING SURFACE FIT POINTS BASED ON FOCUS PEAK UNCERTAINTY

(75) Inventor: Shannon R. Campbell, Bothell, WA (US)

(73) Assignee: Mitutoyo Corporation, Kawasaki-shi (JP)

(*) Notice: Subject to any disclaimer, the term of this patent is extended or adjusted under 35 U.S.C. 154(b) by 757 days.

(21) Appl. No.: 12/633,695

(22) Filed: Dec. 8, 2009

(65) Prior Publication Data
US 2011/0133054 A1 Jun. 9, 2011

(51) Int. Cl.
G02B 27/64 (2006.01)
G06K 9/00 (2006.01)
G01B 11/24 (2006.01)

(52) U.S. Cl.
USPC ............... 250/201.2; 382/141; 356/609

(58) Field of Classification Search
USPC ........ 250/201.3, 201.1, 559.1, 559.4, 559.19, 250/559.29, 559.04, 559.05, 559.07, 201.2, 250/201.4, 208.1, 214 R, 214.1, 201.7, 221; 356/609, 624, 625, 516, 496, 498, 500, 356/904, 124, 125; 348/86, 94, 95; 382/100, 152, 255, 325, 263, 274, 141, 382/266
See application file for complete search history.

(56) References Cited

U.S. PATENT DOCUMENTS

| | | | |
|---|---|---|---|
| 6,542,180 B1 | 4/2003 | Wasserman | |
| 7,120,286 B2 * | 10/2006 | Yu et al. | 382/145 |
| 7,324,682 B2 | 1/2008 | Wasserman | |
| 7,454,053 B2 | 11/2008 | Bryll | |
| 8,111,938 B2 * | 2/2012 | Bryll et al. | 382/255 |
| 2005/0031191 A1 | 2/2005 | Venkatachalam | |
| 2005/0216237 A1 | 9/2005 | Adachi | |
| 2006/0001955 A1 * | 1/2006 | Kinney et al. | 359/391 |
| 2006/0007345 A1 | 1/2006 | Olson | |
| 2007/0112535 A1 * | 5/2007 | Bryll | 702/86 |
| 2009/0103773 A1 | 4/2009 | Wheeler | |

OTHER PUBLICATIONS

Aydin, T., and Y.S. Akgul, "A New Adaptive Focus Measure for Shape From Focus," Proceedings of the British Machine Vision Conference (BMVC 2008), Leeds, U.K., Sep. 1-4, 2008, 10 pages.
Bryll, R.K., and M. Nahum, "System and Method for Fast Approximate Focus," U.S. Appl. No. 12/343,383, filed Dec. 23, 2008.

(Continued)

Primary Examiner — Pascal M Bui Pho
Assistant Examiner — Jennifer Bennett
(74) Attorney, Agent, or Firm — Christensen O'Connor Johnson Kindness PLLC

(57) ABSTRACT

A machine vision inspection system acquires a plurality of images of a workpiece region of interest at various focus heights, and determines a Z-height (e.g., the best focus height) for the region of interest based on a focus peak determining data set for the region of interest. The focus peak determining data set is derived from the plurality of images. The machine vision inspection system also determines Z-height quality meta-data based on data derived from the plurality of images (e.g., based on the focus peak determining data set), and associates the Z-height quality meta-data with the corresponding Z-heights. The Z-height quality meta-data are usable to establish weighting factors that are used in association with the corresponding best focus Z-heights in subsequent operations that fit a workpiece surface representation to a plurality of the best focus Z-heights.

20 Claims, 7 Drawing Sheets

(56) References Cited

OTHER PUBLICATIONS

"QVPAK 3D CNC Vision Measuring Machine: Operating Guide," Version 2.0, Manual No. 4911GB, Series No. 359, Mitutoyo Corporation & Micro Encoder Inc., Kanagawa, Japan, Sep. 1996.

"QVPAK 3D CNC Vision Measuring Machine: User's Guide," Version 7.1, 2d ed., Manual No. 99MCB225A1, Series No. 359, Mitutoyo Corporation & Micro Encoder Inc., Kanagawa, Japan, Sep. 2003.

"Robust Statistics," Wikipedia, The Free Encyclopedia, Sep. 25, 2009, <http://en.wikipedia.org/wiki/Robust_statistics> [retrieved Oct. 8, 2009], 13 pages.

Schuckman, K., and L. Graham, "A New Framework for Accuracy Assessment of Lidar Data and Derived Elevation Models," Proceedings of the Second National Lidar Meeting, May 21-22, 2008, Reston, VA., pp. 1-26.

* cited by examiner

WEIGHTING SURFACE FIT POINTS BASED ON FOCUS PEAK UNCERTAINTY

FIELD

The present disclosure relates generally to machine vision inspection systems, and more particularly to methods related to precise dimensional inspection using a machine vision system.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180, (hereinafter "the '180 patent") teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) may be used manually to accomplish manual inspection and/or machine control operations. Their set-up parameters and operation can also be recorded during learn mode, in order to create automatic inspection programs, or "part programs." Set-up parameters may typically be configured using various graphical user interface widgets and/or menus of the vision inspection system software. Such tools may include, for example, edge/boundary detection tools, autofocus tools, shape or pattern matching tools, dimension measuring tools, and the like. For example, such tools are routinely used in a variety of commercially available machine vision inspection systems, such as the QUICK VISION® series of vision systems and the associated QVPAK® software, discussed above.

Accuracies in the micron or sub-micron range are often desired in such systems. This is particularly challenging with regard to Z-height measurements. Z-height measurements (along the optical axis of the camera system) are generally derived from a "best focus" position, such as that determined by an autofocus tool. Determining a best focus position is a relatively complex process that generally depends on combining and/or comparing information derived from multiple images. Thus, the level of precision and reliability achieved for Z-height measurements is often less than that achieved for the X- and Y-measurement axes, where measurements are typically based on feature relationships within a single image.

A particular problem arises when determining a plurality of three-dimensional (3D) data points across the surface of a workpiece, and attempting to use the resulting 3D data points together to determine the shape or profile of the surface. A set of 3D data points may be referred to as "point cloud" data. Typically, a curve or surface is fit to the point cloud data. However, the Z-height accuracy and reliability may be poor for at least some of the 3D data points, for a number of reasons. As a first example, when the surface is strongly curved (e.g., the surface of an IC ball grid array solder ball), some parts of the surface are at an extreme angle of incidence, such that they return little light and are underexposed in the autofocus images. As a another example, some parts of the surface may be highly textured, such that they include a range of local Z heights that simply cannot be imaged or "autofocused" with an uncertainty that is less than their Z range. As a result, it is frequently necessary for a surface or curve fitting algorithm to deal with point cloud data that includes poor quality Z-height coordinates.

While there are many known algorithmic approaches for fitting point cloud data that includes poor quality Z-height coordinates, most of them rely simply on some method of weighting and/or rejected geometric outliers. Defining a geometric outlier is generally based on how far a point deviates from a current best fit curve or surface. There are many approaches to weighting or rejecting point cloud data points based on their distance from a current fit: Tukey's Biweight, Andrew's Sine, Huber, Welsch, Hampel, and others. These are all approaches to minimize the effect that outliers have on the final fit by adjusting the weight of each individual point based on distance from the current fit. In some algorithms, the weighting may be iteratively determined—that is, distance from a first surface determines a first point weighting, then using that point weighting the best fit surface is re-determined, and so on until a stable result is achieved. In some algorithms, the fitted curve or surface may be constrained based on predetermined design information. Certain literature on robust estimation (or fitting) can be found at http:// en.wikipedia.org/wiki/Robust_statistics, as well as in U.S. Pre-Grant Publication Nos. 2005/0216237A1 and 2009/0103773A1.

However, because they are basically "blind" methods that simply treat geometric data statistically, the foregoing methods are at significant risk for eliminating valid data corresponding to localized defects, or having results influenced in a subtle way by low-reliability data that does not fall outside of predetermined geometric thresholds. Some systems for analyzing machine vision point cloud data simply live with these risks, and/or perform time-consuming data self-consistency checking and/or ad-hoc heuristic analysis in addition to simple geometric surface fitting. Other systems allow or require an operator to manually review the point cloud data and/or fitting results in order to influence the elimination of outliers (e.g., by manual rejection or acceptance, or the like). However, such systems retain a significant possibility for error and/or are time consuming, or both. The present disclosure is directed to providing systems and methods that overcome the foregoing and other disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In contrast to known point cloud fitting methods that rely on weighting and/or rejecting data points based on statistical analysis of geometric data, a system and method are disclosed that associate respective Z-height coordinates with respective Z-height meta-data that is indicative of their quality or uncertainty. In general, such meta-data is referred to here as Z-height quality meta-data, or a Z-height quality metric, regardless of its specific derivation or final form; as long as it qualitatively or quantitatively indicates the relative reliability or uncertainty of a Z-height coordinate. Subsequently, a point cloud fitting method may rely on weighting and/or rejecting data points based on their Z-height quality meta-data. In some embodiments, a point cloud fitting method may include data point weighting and/or rejection based on the Z-height quality meta-data in combination with statistical analysis of geometric data.

In accordance with one aspect of the present disclosure, a machine vision inspection system may implement a method that acquires a plurality of images of a defined workpiece region of interest at various focus heights and determines a best focus Z height (e.g., the best focus height) for the defined region of interest based on a focus peak determining data set for the region of interest. The focus peak determining data set is derived from the plurality of images. The machine vision inspection system also determines Z-height quality meta-data for the region of interest based on data derived from the plurality of images (e.g., based on the focus peak determining data set), and associates the Z-height quality meta-data with the corresponding Z height. The Z-height quality meta-data is indicative of the reliability and/or uncertainty of the corresponding best focus Z height for the region of interest. The Z-height quality meta-data is associated with (e.g., stored and/or applied in association with) the corresponding best focus Z height such that it is usable to establish a weighting factor that may be used in association with the corresponding best focus Z height in subsequent operations that fit a workpiece surface representation to a plurality of such best focus Z heights.

In various embodiments, determining the Z-height quality meta-data for a focus region of interest may comprise determining a representative noise level indicated by the data used to determine the best focus Z height for that focus region of interest. In some embodiments, determining the Z-height quality meta-data may comprise determining a relationship (e.g., a ratio or a quotient) between a representative peak height indicated by the focus peak determining data set and a representative noise level indicated by the focus peak determining data set. In some embodiments, the Z-height quality meta-data may be expressed in the form of a weighting factor that is directly usable in workpiece surface fitting operations. In some embodiments, that the Z-height quality meta-data may be used to identify invalid best focus Z heights for corresponding focus regions of interest (e.g., by comparing the Z-height quality meta-data to a Z-height quality meta-data threshold value, or identifying statistically determined Z-height quality meta-data outliers).

The best focus Z-height measurements referred to above (along the optical axis and focusing axis of the camera system) may be derived from a "best focus" position, such as that determined by an autofocus tool or method. In such tools or methods the camera may move through a range of positions along a Z axis (the focusing axis) and capture an image at each position. For each captured image, a focus metric may be calculated based on a region of interest (e.g., a set of pixels) in the image and related to the corresponding position of the camera along the Z axis at the time that the image was captured. This results in focus curve data (which is one type of focus peak determining data set), which may be referred to simply as a "focus curve" or "autofocus curve." The peak of the focus curve, which corresponds to the best focus position along the Z axis, is the Z height for the region of interest used to determine the focus curve. The peak of the focus curve may be found by fitting a curve to the focus curve data and estimating the peak of the fitted curve. In some such embodiments, the Z-height quality meta-data (e.g., a Z-height quality metric) referred to above may be determined based on the characteristics of the corresponding focus curve data.

In one implementation, a precision machine vision inspection system may comprises a graphical user interface and an autofocus video tool, and at least at least some of the operations outlined above may be performed automatically as operations associated with the autofocus video tool. The graphical user interface may be configured to allow the user to select an autofocus tool that provides Z-height quality meta-data from a plurality of alternative autofocus tools, and configure the operating parameters of that autofocus video tool. In one embodiment, a multi-point autofocus tool may be so selected and/or configured, and Z heights and Z-height quality meta-data may be determined for a plurality of focus sub-regions of interest within a global region of interest of the multi-point autofocus tool. In some implementations, the sub-regions of interest have an area that is at most 9×9 pixels, or 7×7 pixels, or less. The present disclosure provides particular advantages in association with Z heights that are based on small focus regions of interest.

It will be appreciated that a fitting procedure that includes weighting factors determined based on Z-height quality meta-data according to this disclosure may in some instances provide relatively small improvements in accuracy (e.g., sub-micron improvements for certain magnifications). However, even small improvements in the accuracy and/or robustness of such measurement operations are important in numerous applications, while also being difficult to achieve. The present disclosure may achieve such improvements, and may in particular provide advantages when performing surface fitting operations related to inspecting certain surfaces that present difficulties for deriving Z coordinates from autofocus operations.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION OF THE PREFERRED EMBODIMENT

Figure 1:
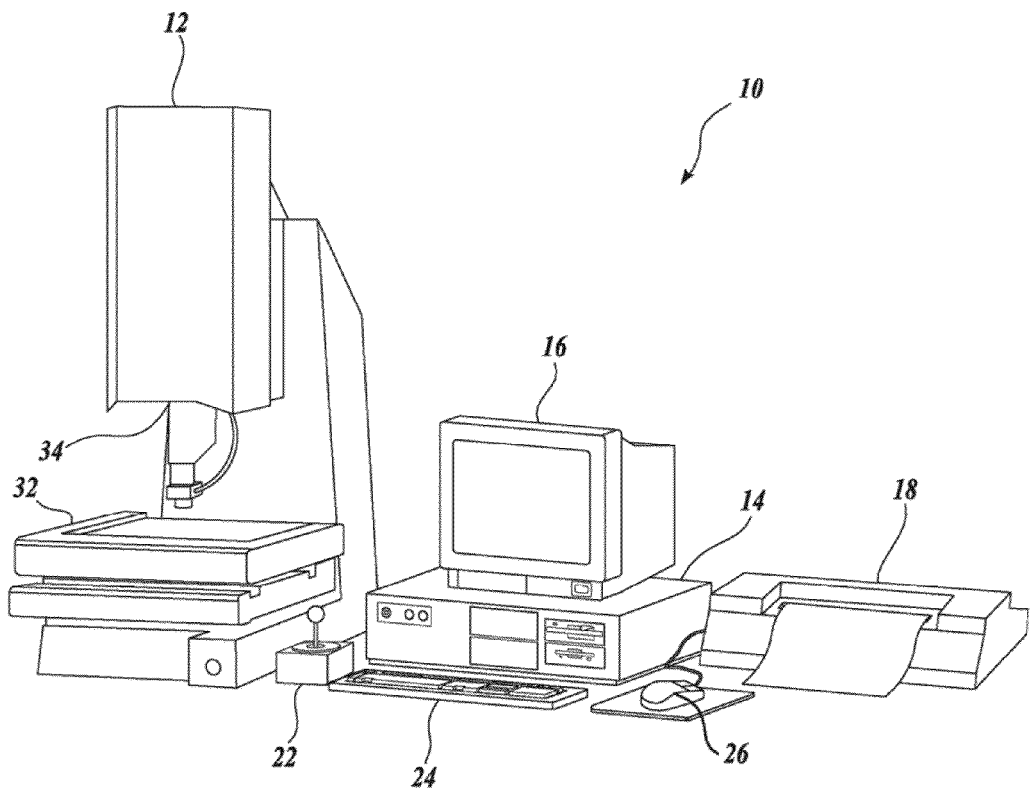
FIG. 1 is a diagram showing various typical components of a general purpose precision machine vision inspection system.

FIG. 1 is a block diagram of one exemplary machine vision inspection system 10 usable in accordance with the present disclosure. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. No. 7,454,053, and in commonly assigned U.S. patent application Ser. No. 12/343,383, filed Dec. 23, 2008, now U.S. Pat. No. 8,111,938, issued Feb. 7, 2012, which are each hereby incorporated herein by reference in their entireties. Various aspects of vision measuring machines and control systems are also described in more detail in commonly assigned U.S. Pre-Grant Publication No. 2005/0031191A1 and U.S. Pat. No. 7,324,682, which are also each hereby incorporated herein by reference in their entireties.

Figure 2:
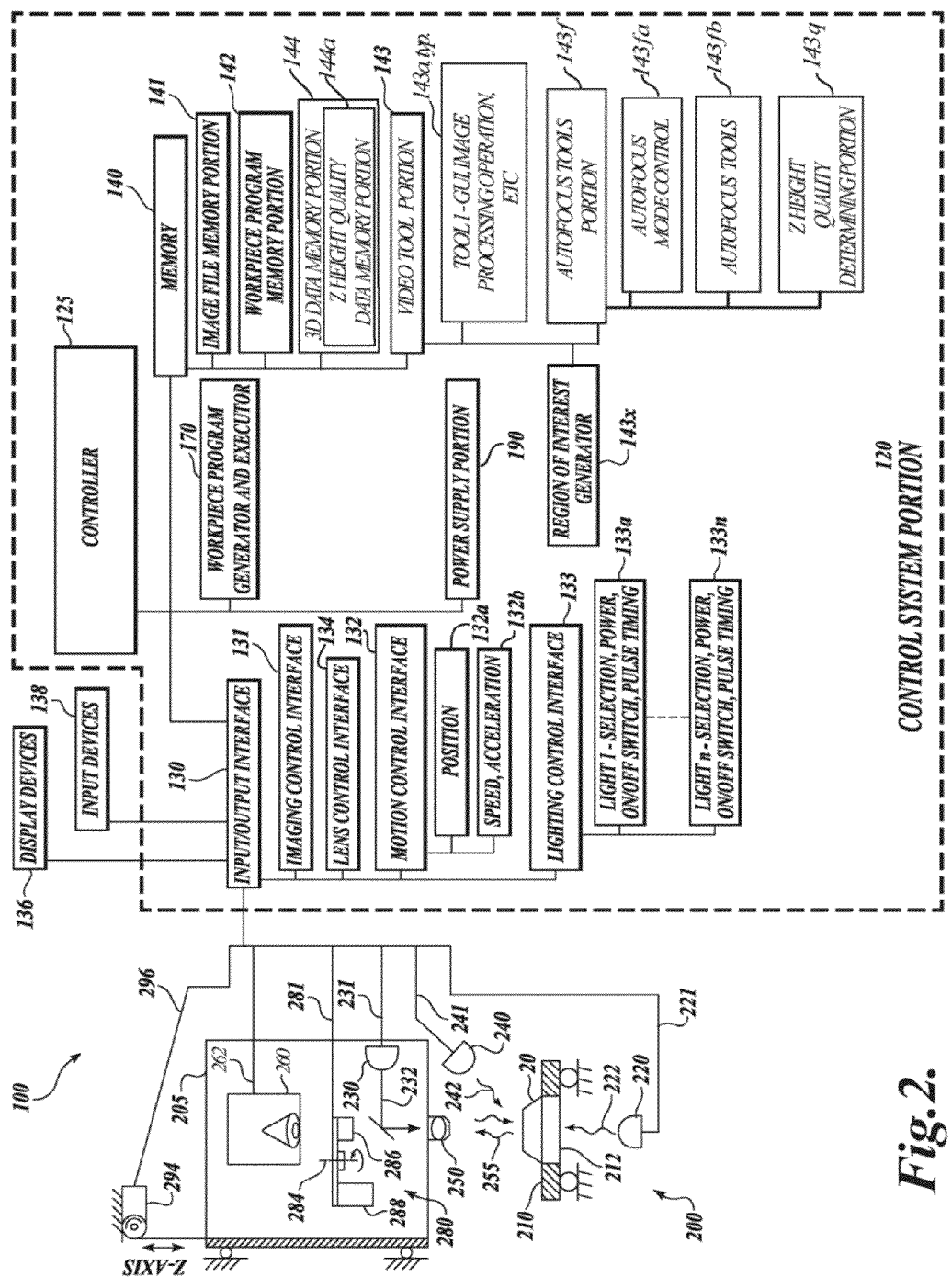
FIG. 2 is a diagram of a control system portion and a vision components portion of a machine vision inspection system.

FIG. 2 is a diagram of a control system portion 120 and a vision components portion 200 of a machine vision inspection system 100 in accordance with the present disclosure. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of a stage light 220, a coaxial light 230, and a surface light 240 may emit source light 222, 232, or 242, respectively, to illuminate the workpiece 20. The source light is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284, to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z axis to change the focus of the image of the workpiece 20 captured by the camera system 260. The term "Z axis," as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100.

The memory 140 includes an image file memory portion 141, a workpiece program memory portion 142 that may include one or more part programs, or the like, a 3D data memory portion 144 which may include a Z-height quality data memory portion 144a, and a video tool portion 143. The video tool portion 143 includes representative tool portion 143a (and other analogous video tool portions, not shown), which determines the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

The video tool portion 143 includes the autofocus tools portion 143f, which provides various operations and features related to autofocus operations, as described in greater detail below. In one embodiment, the autofocus tools portion 143f may include an autofocus mode control 143fa, autofocus tools 143fb, and a Z-height quality determining portion 143q. Briefly, the autofocus tools 143fb may perform various operations similarly to known autofocus tools, for example, performing operations in learn mode and run mode such as utilizing a selected lighting level for acquiring a current image stack at various Z heights, generating all or part of a focus curve, and finding its peak as a best focus position. Additional autofocus tool operations which are the subject of this disclosure are described in greater detail below. The autofocus mode control 143fa may perform operations, as disclosed herein, to configure the autofocus tools 143fb, and/ or the Z heights quality determining portion 143q and/or autofocus tool modes, depending on which tool or mode is activated.

As will be described in more detail below, the Z-height quality determining portion 143q may operate to determine a Z-height quality metric for a defined region of interest based on a focus peak determining data set for that region of interest. In some embodiments, a region or sub-region of interest may comprise a small set of pixels defined to correspond to, or represent, individual pixel locations. In some embodiments, a Z-height weighting factor may be determined by the Z-height quality determining portion 143q for each region or sub-region of interest, based on the Z-height quality metric. In other embodiments, Z-height weighting factor determination is performed later in association with point cloud processing operation, based on the Z-height quality metrics, by a separate processor or a separation portion of the control system portion 120. The Z-height quality metrics and/or Z-height quality weighting factors may be utilized for weighting the corresponding Z coordinates when fitting point cloud data, such that Z coordinates corresponding to low or high Z-height quality metrics receive corresponding low or high weighting in the fitting procedure. This procedure uses meta-data derived based on autofocus image data to overcome several of the disadvantages previously outlined with regard to weighting procedures that rely purely on statistical analysis of geometric data.

Alternative configurations are also possible for the autofocus tools portion 143f. For example, the autofocus tools 143fb and Z-height quality determining portion 143q may include partitioned mode control functions such that a separate mode control portion 143fa may be omitted. Alternatively, the autofocus tools portion 143f may provide one or more generic autofocus tool elements, and the mode control portion 143fa may provide operations that govern the user interface and interrelationships of the generic autofocus tool elements in a manner that depends on which tool behavior is desired. In such a case, the circuits, routines, or applications that provide the operations of the autofocus tools 143fb, and/or the Z-height quality determining portion 143q may be merged and/or indistinguishable.

In certain implementations, the autofocus mode control 143fa may be utilized to implement a Z-height quality metric determining autofocus mode (as opposed to a separate tool). More generally, this disclosure may be implemented in any now known or later-developed form that is operable in conjunction with the machine vision inspection system 100 to provide the features disclosed herein in relation to the autofocus operations.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, and further may store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a graphical user interface operable through the input/output interface 130.

The signal lines or busses 221, 231, and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

In various exemplary embodiments, when a user utilizes the machine vision inspection system 100 to create a part program for the workpiece 20, the user generates part program instructions either by explicitly coding the instructions automatically, semi-automatically, or manually, using a workpiece programming language, or by generating the instructions by operating the machine vision inspection system 100 in a learn mode to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the sequence(s) are captured and converted to corresponding part program instructions. These instructions, when the part program is executed, will cause the machine vision inspection system to reproduce the trained image acquisition and inspection operation to automatically inspect a workpiece or workpieces matching the workpiece used when creating the part program.

These analysis and inspection methods that are used to inspect features in a workpiece image are typically embodied in various video tools included in the video tool portion 143 of the memory 140, including the autofocus tools 143fb, which may include and/or implement the associated operations of the Z-height quality determining portion 143q. Many known video tools, or "tools" for short, are exemplified in commercially available machine vision inspection systems, such as the QUICK VISION® series of vision systems and the associated QVPAK® software, discussed above.

Autofocus tools such as tools 143fb typically acquire series of images and analyze focus curves as part of a process for determining one or more "best focus" positions corresponding to the peaks of the focus curves. As will be described in more detail below, by utilizing the methods of the present disclosure which determine Z-height quality metrics (e.g., such as are determined by the Z-height quality determining portion 143q) and corresponding Z-height quality weighting factors, the accuracy and reliability of shape-fitting algorithms and overall measurement processes are improved.

Figure 3:
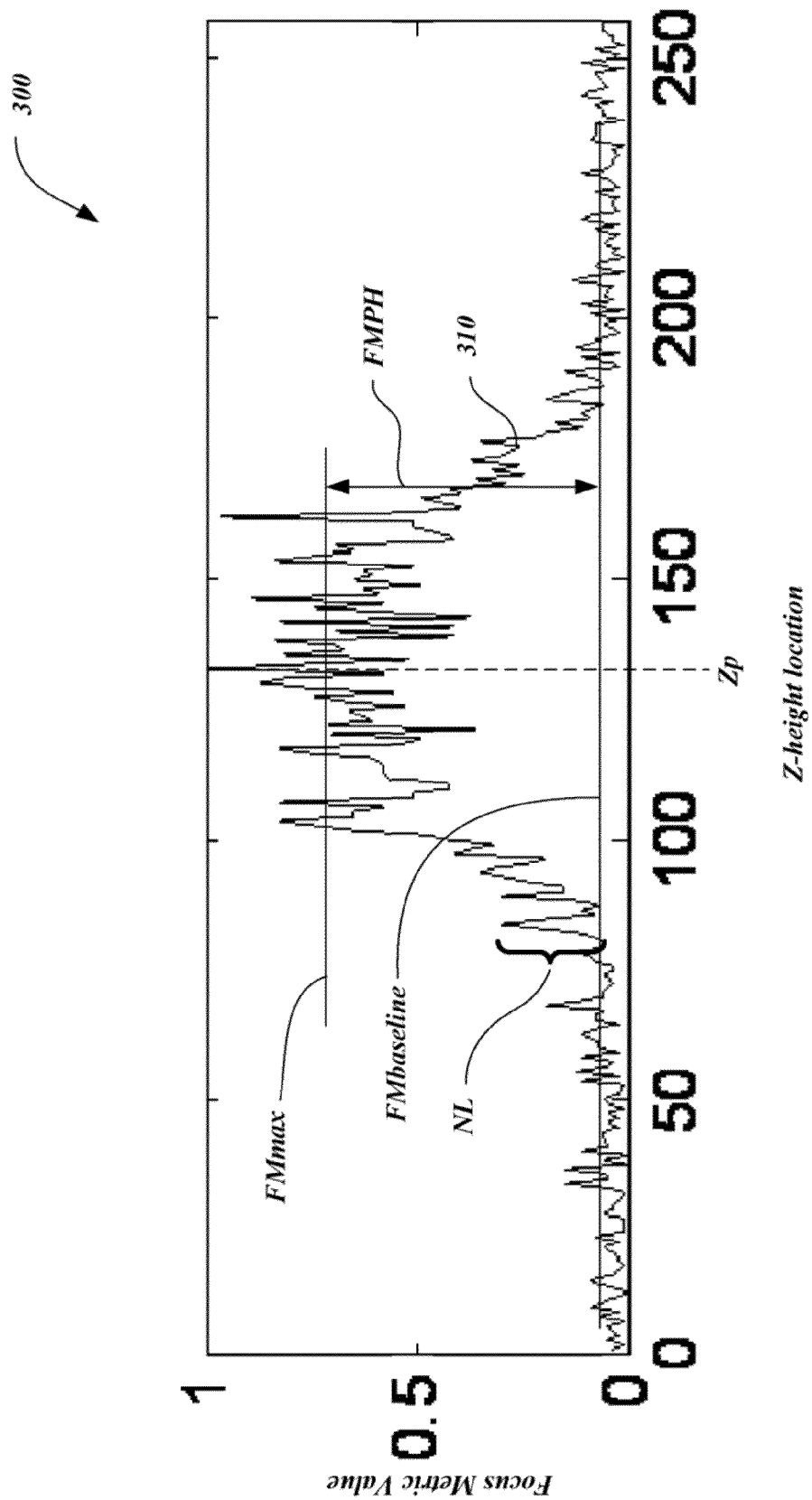
FIG. 3 is a representative graph illustrating relatively noisy focus curve data.

FIG. 3 is a representative graph 300 illustrating a noisy focus curve 310. In other words, the data points of the focus curve 310 include various significant noise components or contributions, as well as the desired components that are related to image focus. The focus curve 310 may be determined according to operations outlined previously, and/or by other operations associated with known autofocus methods and/or commercially available autofocus video tools.

In the embodiment shown in FIG. 3, the focus metric values (that is, the values depicted along the y-axis direction in the graph 300) have been normalized so that the maximum value is one. This normalization may be convenient in some embodiments, but may be omitted in other embodiments. In some embodiments, the focus metric values may be based on a calculation of the contrast or sharpness of the region of interest in images included in an autofocus image stack (that is, a set of images focused at various Z heights). The X axis represents the Z heights of the images included in the autofocus image stack, ranging from 0 to 250 microns in this specific example.

It will be appreciated that various data points of the focus curve 310 include a significant noise component. Therefore, the focus curve is not smooth and the estimated focus peak Zp (e.g., as estimated based on the peak location of a curve such Gaussian curve fit to the focus curve 310) should be regarded as relatively uncertain. For example, by inspection of the focus curve 310 it appears that one may be relatively certain that Zp is accurate within +/−30 microns, but it is quite uncertain that it is accurate within +/−5 microns. It will be appreciated that the uncertainty of Zp could be much greater if the focus curve data were not so densely sampled along the Z-height axis (that is, if relatively few image stack images were widely spaced along the Z axis). Factors that contribute to noisy focus curve data and focus peak or Z height uncertainty may generally include having a small number of pixels in the region of interest, having a very rough or multi-level surface in the region of interest, and/or poor lighting.

For example, with few pixels in the region of interest (e.g., 36 pixels, or even as few as 9 pixels), light from "surrounding pixels" outside the region of interest may blur into a significant portion of the region of interest, thus "contaminating" the focus curve for the region of interest. Also, for few pixels in the region of interest along with a very rough surface, the region of interest may actually have no "best" focus height. In such a case, for random texturing, the noise for each focus curve data point may be approximately inversely proportional to the square root of the number of pixels in the region of interest (e.g., if each portion of the surface that corresponds to a particular pixel is at a different random height). Thus, the focus curve data for a small region of interest may appear particularly noisy. In addition, poor lighting due to poor settings or due to an inherently intractable surface, may result in over or under exposure of pixels in the region of interest, leading to inherently low contrast and poor signal to noise in the focus metrics used for establishing the focus curve.

As will be described in more detail below, in accordance with the present disclosure, a Z-height quality metric or meta-data may be utilized to characterize the relative noise or Z-height uncertainty reflected in a focus peak determining data set (e.g., the focus curve data 310) for a region of interest. The Z-height quality metric or meta-data thus tends to indicate the relative reliability or uncertainty associated with a Z-height estimate based on a particular focus peak determining data set for a particular region of interest. Respective Z-height quality weighting factors may be determined based on each respective Z-height quality metric or meta-data, for conveniently and appropriately reflecting the relative reliability or uncertainty of each respective Z-height coordinate used by a point cloud fitting routine.

In one embodiment, the Z-height quality meta-data may be defined as a metric based on a relationship (e.g., a ratio) between a representative focus metric peak height indicated by a focus peak determining data set and a representative noise level or "noise height" indicated by the focus peak determining data set. For example, FIG. 3 shows a representative focus metric maximum value FMmax (e.g., as established by fitting a curve to the data 310 and taking its maximum value, or averaging the maximum 10% of the data 310), and a focus metric baseline value FMbaseling (e.g., as established by averaging the minimum 40% of the data 310). The representative focus metric peak height FMPH may be determined as the difference between FMmax and FMbaseline, in this example.

FIG. 3 also shows the representative noise level NL (e.g., as established by fitting a curve to the data 310 and taking the standard deviation of the residuals between the data 310 and the fit curve). For this example, the Z-height quality meta-data may be defined as the metric (FMPH/NL), such that a higher value for the Z-height quality meta-data indicates a higher focus metric peak relative to the focus metric noise level, which tends to indicates the peak focus location with higher reliability and/or lower uncertainty. However, it should be appreciated that this embodiment of determining Z-height quality meta-data is exemplary only and is not limiting. The determination of Z-height quality meta-data and/or metrics is explained in greater detail below.

Figure 4:
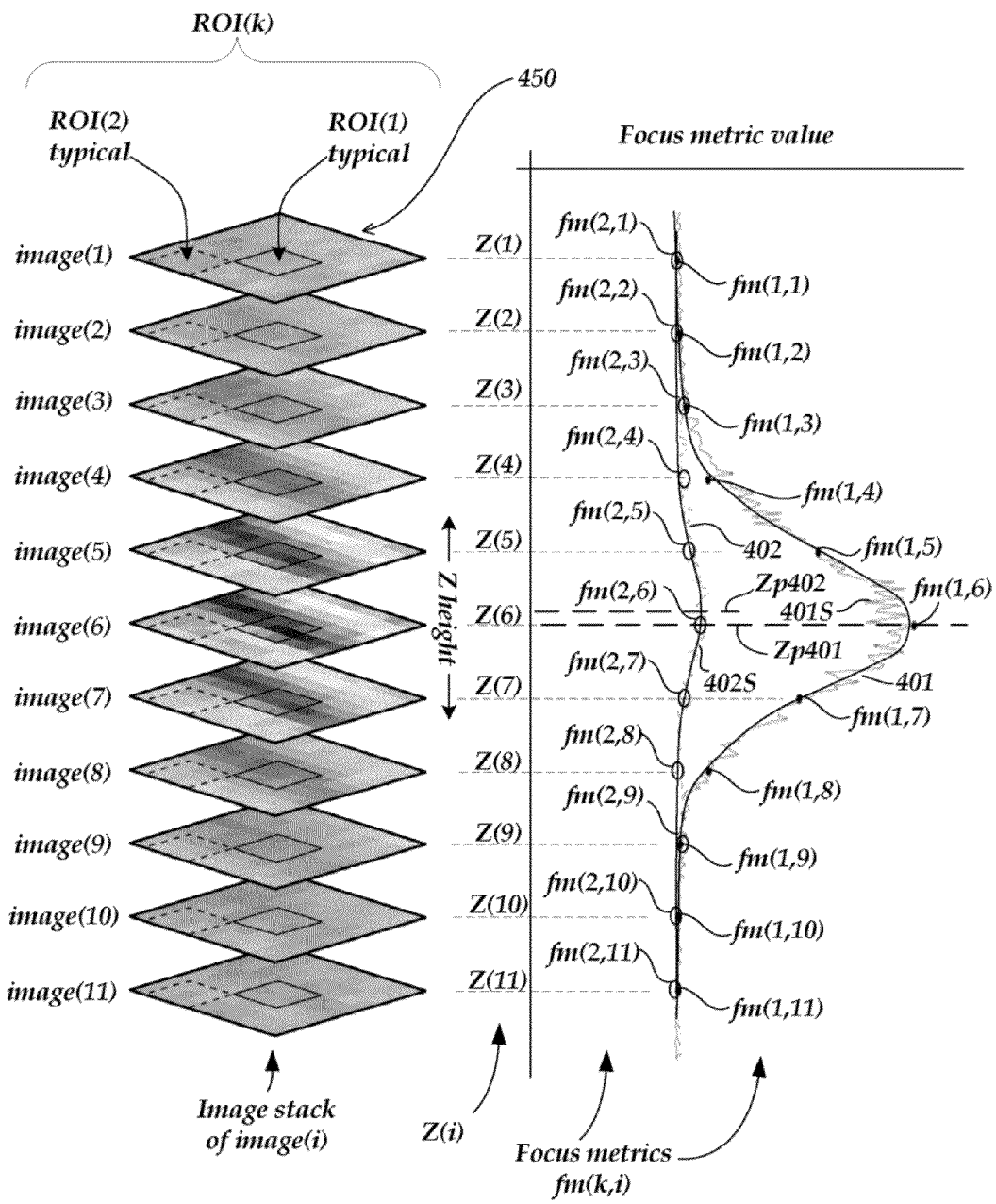
FIG. 4A is a representative graph illustrating two focus curves with different signal-to-noise levels corresponding to different Z-height quality metrics.
FIG. 4B is a diagram of a schematically represented variable focus image stack which includes two different regions of interest corresponding to the data points of the two different focus curves of FIG. 4A.

FIGS. 4A and 4B are related FIGURES that are aligned relative to one another along the Z-height axis shown in the figures. FIG. 4A is a representative graph 400A illustrating two examples of fit focus curves 401 and 402 associated with different signal-to-noise levels corresponding to different Z-height quality metrics, and FIG. 4B is a diagram of a variable focus image stack 400B that includes two different regions of interest ROI(k), in particular ROI(1) and ROI(2), that correspond to the data points fm(1,i) and fm(2,i) corresponding to the two different focus curves 401 and 402, respectively, of FIG. 4A. The regions of interest ROI(k) are included in an imaged surface region 450 of a workpiece.

Regarding the term "region of interest," it should be appreciated that some "single point" autofocus tools return a single Z height corresponding to an entire region of interest. However, known "multi-point" type autofocus tools may return multiple Z heights corresponding to individual "sub-regions of interest" (e.g., a grid of sub-regions of interest) within a global region of interest defined by the multi-point type autofocus tool. For example, such sub-regions of interest may be manually and/or automatically defined as centered on each (or most) pixels within the global region of interest. Thus, in some cases, ROI(1) and ROI(2) may be regarded as representative sub-regions of interest within a global region of interest.

Both a Z height and a Z-height quality metric may be established according to this disclosure for any defined autofocus region of interest, whether it is a region of interest of a single point autofocus tool or a sub-region of interest within a global region of interest defined by a multi-point autofocus tool. Thus, it will be understood that when the term region of interest is used in relation to establishing a Z height and/or a Z-height quality metric, that sub-regions of interest (e.g., within a global region of interest defined by a multi-point autofocus tool) may be encompassed within the meaning of that term. To illustrate this point, the regions of interest ROI(1) and ROI(2) are shown to be relatively small (e.g., 3×3 pixels), as would be typical of some sub-regions of interest of a multi-point autofocus tool. For example, such a region size may be utilized for determining a focus peak for a single central pixel in each region (or sub-region) of interest, in some embodiments.

As shown in FIG. 4B, each of the images image(1)-image(11) of the image stack image(i) include the centrally located region of interest ROI(1) for which the determined focus metric values correspond to the focus metric data points fm(1,$i$) on the focus curve 401. The region of interest ROI(1) is schematically indicated in FIG. 4B as including a relatively high level of contrast (e.g., in image(6)), corresponding to the relatively greater focus metric values shown on the focus curve 401. Similarly, each of the images image(1)-image(11) of the image stack image(i) include the peripherally located region of interest ROI(2) for which the determined focus metric values correspond to the focus metric data points fm(2,$i$) on the focus curve 402. The region of interest ROI(2) is schematically indicated in FIG. 4B as including a relatively low level of contrast (e.g., in image(6)), corresponding to the relatively lesser focus metric values shown on the focus curve 402.

As shown in FIG. 4A, each focus metric value fm(1,$i$) or fm(2,$i$) may be regarded as sampling continuous underlying focus data 401S or 402S, respectively. It may be seen in FIG. 4A that the underlying focus data 401S or 402S is relatively noisy (e.g., due to the small size of the corresponding regions of interest). However, in the case of the focus curve 401, due to higher contrast in the corresponding region of interest the focus metric values in the vicinity of the focus curve peak (e.g., near Zp401) are relatively large compared to the size of the "noise component" in the underlying focus data. In contrast, in the case of the focus curve 402, due to low contrast in the corresponding region of interest, the focus metric values in the vicinity of the focus curve peak (e.g., near Zp402) are relatively similar to the size of the "noise component" in the underlying focus data.

In one specific example, the higher focus metric values indicated in the focus curve 401 may be due to the surface area in the region of interest ROI(1) being highly textured and producing high contrast in focused images. In comparison, the lower focus metric values indicated in the focus curve 402 may be due to the surface area in the region of interest ROI(2) having little texture and producing little contrast in focused images. In any case, it will be appreciated that because of the low "signal to noise" associated with the lower peak of the focus curve 402, as compared to relatively high signal to noise associated with the peak of the focus curve 401, that the estimated Z height of the focus peak Zp402 of the focus curve 402 is less reliable or more uncertain than the estimated Z height of the focus peak Zp401 of the focus curve 401.

Thus, in accordance with the present disclosure, a lower Z-height quality metric should be determined for the estimated Z height of the focus peak Zp402, than for the estimated Z height of the focus peak Zp401. As a result, a point cloud fitting algorithm that establishes data point weighting based on Z-height quality metric meta-data may be made to rely more heavily on the estimated Z height of the focus peak Zp401, as compared to the estimated Z height of the focus peak Zp402, when estimating the shape or location of the surface region 450. The determination of Z-height quality metrics is described further below.

Autofocus operations associated with determining a Z height for a region of interest have been previously outlined. Briefly summarizing in relation to FIGS. 4A and 4B, a camera may move through a range of Z-height positions Z(i) along a Z axis (the focusing axis) and capture an image(i) at each position. For each captured image(i), a focus metric fm(k,i) may be calculated based on a region or sub-region of interest ROI(k) (e.g., a set of pixels) in the image and related to the corresponding position Z(i) of the camera along the Z axis at the time that the image was captured. This results in focus curve data (e.g., the focus metrics fm(k,i) at the positions Z(i), which is one type of focus peak determining data set), which may be referred to simply as a "focus curve" or "autofocus curve."

In one embodiment, the focus metric values may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

The Z height (e.g., Zp401 or Zp402) corresponding to the peak of the focus curve, which corresponds to the best focus position along the Z axis, is the Z height for the region of interest used to determine the focus curve. The Z height corresponding to the peak of the focus curve may be found by fitting a curve (e.g., the curve 401 or 402) to the focus curve data (e.g., the data fm(1,$i$) or fm(2,$i$)) and estimating the location peak of the fitted curve. It will be appreciated that while the image stack image(i) is shown for purposes of illustration as only including eleven images, in an actual embodiment a larger number of images (e.g., 100 or more) may be utilized. Exemplary techniques for the determination and analysis of image stacks and focus curves are taught in U.S. Pat. No. 6,542,180, which is commonly assigned and hereby incorporated herein by reference in its entirety.

As indicated previously, in accordance with the present disclosure, it is desired to assign Z-height quality meta-data indicating higher data reliability or lower uncertainty to Z heights estimated for regions of interest that produce higher focus metric values relative to the underlying noise levels (e.g., the focus curve 401), and to assign Z-height quality meta-data indicating lower data reliability or higher uncertainty to Z heights estimated for regions of interest that produce lower focus metric values relative to the underlying noise levels (e.g., the focus curve 402). As previously outlined, in some embodiments, the Z-height quality meta-data may be defined as a metric based on a relationship (e.g., a ratio or quotient) between a representative peak height indicated by the focus peak determining data set and a representative noise level or "noise height" indicated by the focus peak determining data set.

In one embodiment, such a metric may be defined as the ratio of the maximum value of the focus peak determining data set (or a curve fit to the focus peak determining data set) minus a baseline value of the focus peak determining data set (or a curve fit to the focus peak determining data set) divided by an estimated noise value of the focus peak determining data set. In certain implementations, the baseline of the focus peak determining data set may be estimated as its median value, wherein most of the values in that set may be near the baseline and only a relatively small number of values may occur in the region of the focus peak. Such a focus peak determining data set may correspond to an image stack comprising a relatively large number of images (e.g., 100 images) spread over a fairly large Z-height range about the best focus position, for example. In certain implementations, the estimated noise value may be determined as the median absolute difference from the median of the focus peak determining data set. In such a case, the corresponding Z-height quality metric may be determined in some implementations according to:

$$ZQM(k) = \frac{(\max(fm(k, i)) - \text{median}(fm(k, i)))}{\text{median}(|fm(k, i) - \text{median}(fm(k, i))|)} \quad \text{(Eq. 1)}$$

where ZQM(k) is the Z-height quality metric for the kth region or sub-region of interest, and fm(k,i) is the focus metric determined based on the kth region of interest in the ith image of the image stack.

For an image stack comprising a relatively large number of images spread over a fairly large Z-height range about the best focus position, large values of ZQM(k) based on Equation 1 reliably indicate a strong focus peak in comparison to the noise level of the underlying data, which produces to a relatively reliable Z-height estimate. Based on this disclosure, one of ordinary skill in the art may determine acceptable alternative ways of estimating a Z-height quality metric to be associated with an estimated Z height determined based on a focus peak determining data set.

For example, the standard deviation of the data set may be used as a measure of the noise in the focus metric signal (used in the denominator of Equation 1), although that measure may be less desirable in certain implementations in that it incorporates both the focus peak and the noise into a single value. Another measure of the noise may be determined by smoothing the focus metric signal (e.g., using a moving average), and then computing the deviation of the raw focus metric signals from the smoothed signal. In this way, the smoothed signal can be used as an approximation to the signal without noise, and then the noise can be estimated. However, in certain implementations, this method may be relatively dependent on the technique that is chosen for smoothing the signal.

Substitutes may be determined for other parts of Equation 1 as well. For example, the maximum value of the focus peak determining data set may be replaced with an average of the highest few values in some embodiments. Similarly, the baseline value of the focus peak determining data set may be replaced with an average of the lowest several values in some embodiments. In other embodiments, the difference between the maximum and baseline values (used in the numerator of Equation 1) may be estimated based on a fit curve (e.g., a Gaussian curve) rather than based on the raw data of the focus peak determining data set. Other variations may be determined by one of ordinary skill in the art, based on the general principles disclosed herein.

Ultimately, it may be desired to weight the Z-height data as it is used in a point cloud fitting method, depending on the estimated reliability of that Z-height data. For example, it may be desired to determine a surface shape conforming to a function Zfit such that the residuals in Equation 2 are approximately minimized:

$$\text{residuals} = \sum_{k=1}^{n} [ZWF(k) * [(Zp(k) - Zfit(k))]]^2 \quad \text{(Eq. 2)}$$

where ZWF(k) is a weighting factor indicating the quality or reliability of the estimated Z height Zp(k) for the kth region of interest of the surface to be fit, and Zfit(k) is the "fit" Z height at the kth region of interest of the surface, as determined based on a candidate surface fitting function Zfit. Of course, it will be appreciated that each region of interest k corresponds to a particular representative (x,y) coordinate location on the surface, and appropriate substitutions of the representative (x,y) coordinates may be made for each value of k that occurs in Equation 2.

In some embodiments and/or applications, a raw Z-height quality metric ZQM(k) determined as outlined above may vary by several orders of magnitude. If used directly as Z-height quality weighting factors ZWF(k), such disparate weights could introduce unwanted bias into the system and/or cause some algorithms used to determine a fit function Zfit to become unstable. Thus, in one embodiment, the raw Z-height quality metrics ZQM(k) may be transformed using a hyperbolic tangent function and chosen transformation parameters, as follows:

$$ZWF(k) = \frac{1}{2}[1 + \tanh(\beta(ZQM(k) - T))] \quad \text{(Eq. 3)}$$

This function smoothly maps raw Z-height quality metric values ZQM(k) in the range from ($-\infty$ to $\infty$) to transformed Z-height quality weighting factors ZWF(k) values in the range (zero to 1). In one specific example implementation, transformation parameter values of T=10 and $\beta$=0.01 were chosen as producing a desirable transformation after experimental trials using data from certain representative surfaces. In one embodiment, the foregoing EQUATION 3 may essentially result in a type of "normalization." It will be appreciated that other alternative techniques may also be utilized to ensure that focus peaks with a higher certainty of being accurate are given comparatively higher weights for the fitting algorithm. Also, in certain alternative embodiments, these weighting values may be used in combination with "standard" statistically-based geometric weighting and outlier methods.

In addition, in some embodiments, thresholding may be applied to completely eliminate Z heights with an associated quality metric below a Z-height quality threshold, and weighting the survivors of the thresholding. For example, in one such embodiment, the value T in Equation 3 is used both as a threshold for ZQM(k) in order to eliminate corresponding data, and as a transformation parameter in Equation 3 for providing transformed Z-height quality weighting factors ZWF(k) for the surviving data. Also, in some embodiments, statistically determined Z-height quality meta-data outliers may be identified and the corresponding best focus Z-height data may be eliminated or otherwise identified as invalid.

It will be appreciated that all of the foregoing equations and values are exemplary only and not limiting. In various embodiments, Z-height quality metrics or meta-data may be expressed and/or stored in memory in a form that is suitable for use directly as Z-height quality weighting factors in a variety of point cloud fitting algorithms, in which case a weighting factor (e.g., such as that defined by Equation 3) may be regarded as both a weighting factor and as a Z-height quality metric or meta-data. In other embodiments, Z-height quality weighting factors suitable for various point cloud algorithms may be determined by performing secondary or integrated transformation operations on initially determined and/or stored Z-height quality metrics or meta-data. In still other embodiments, point cloud fitting algorithms may be adapted to provide operations that are compatible with a particular expressed and/or stored form of Z-height quality metric or meta-data.

In one embodiment, a Z-height quality metric or meta-data may take the form of an estimated uncertainty in the same units of measurement that are used to express the estimated best focus Z height. The main point is that Z-height quality meta-data or a Z-height quality metric are provided that indicate the reliability or uncertainty of corresponding estimated Z heights based on data used to determine that best focus Z height (e.g., a peak focus determining data set), and that the Z-height quality meta-data or metric is made available in a form that can be used for weighting surface fitting residuals used in fitting a surface to the estimated Z heights.

Figure 5:
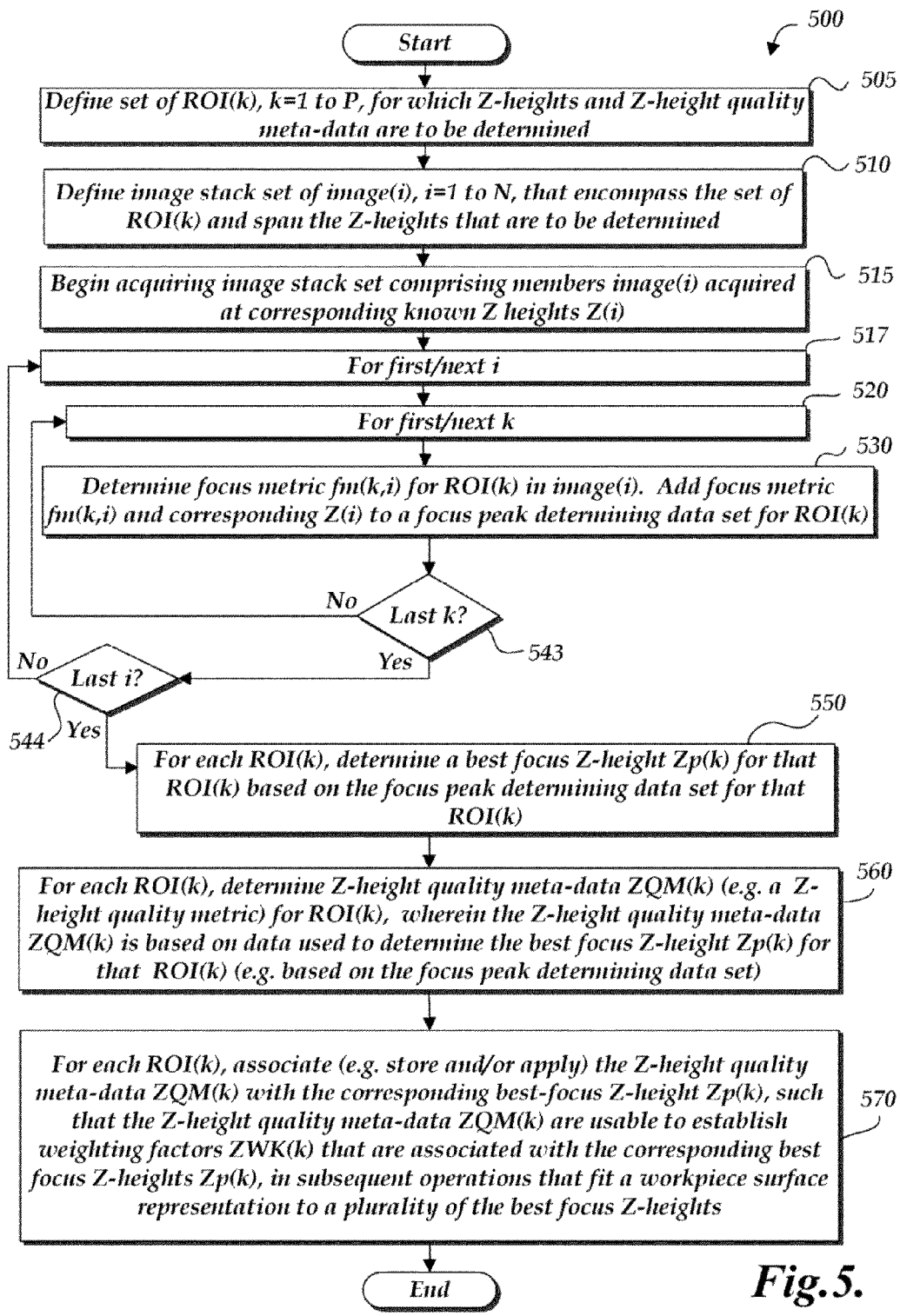
FIG. 5 is a flow diagram illustrative of one generic exemplary routine for defining a set of regions of interest to be measured and determining corresponding Z heights and associated Z-height quality metrics in accordance with the present disclosure.

FIG. 5 is a flow diagram illustrative of one generic exemplary routine 500 for defining a set of regions of interest to be measured and determining corresponding Z heights and associated Z-height quality meta-data in accordance with the present disclosure. At block 505, a set of regions of interest ROI(k) is defined or selected for k=1 to P, for which Z heights and corresponding Z-height quality meta-data are to be determined. It will be appreciated that, in some embodiments, each region (or sub-region) of interest ROI(k) may be relatively small (e.g., as small as 9×9 pixels, or 7×7 pixels, or even less) and may correspond to an individual coordinate location (e.g., a representative x-y pixel coordinate location) in accordance with the desired goal of providing estimated 3-D coordinate data (point cloud data) to a shape-fitting algorithm for fitting a shape to a surface region that includes the regions of interest ROI(k).

At block 510, an image stack set of images is defined, comprising image(i) for i=1 to N. The field of view of the image stack set may encompass the set of regions of interest ROI(k), and the Z range of the image stack set generally spans the Z heights that are expected for the set of regions of interest ROI(k). At block 515, operations to acquire members of the image stack set image(i), at corresponding Z height Z(i), are begun. A Z height Z(i) is the Z height indicated by the machine vision inspection system at the time of acquisition of image(i), and corresponds to the location of a focused object plane for that image, regardless of whether or not a workpiece surface is actually located at that focused object plane.

In some embodiments, it may be advantageous to have the operations of other blocks (e.g., blocks 517-543) executed partially in parallel with block 515, that is, image analysis operations may begin at any convenient time after one or more regions of one or more initial images have been acquired in order to conserve operation time and/or memory. Thus, at block 517, a processing loop for image analysis operations on the first/next image(i) may begin at any convenient time after one or more regions or sub-regions of the first/next image(i) have been acquired.

At block 520, a nested processing loop begins for processing operations related to the first/next regions of interest ROI(k), for k=1 to P in the current image(i). At block 530, a focus metric fm(k,i) is determined for the current region of interest ROI(k) in the current image(i), and each such focus metric fm(k,i) and corresponding Z height Z(i) is added to a focus peak determining data set (e.g., a focus curve data set) for the current region of interest ROI(k).

At decision block 543, a determination is made as to whether there are any more regions of interest ROI(k) to be processed for the current image(i) in the nested processing loop. If so, operation returns to block 520, otherwise operation continues to decision block 544.

At decision block 544, a determination is made whether there is another image(i) to be processed in the processing loop begun at block 517. If so, operation returns to block 517, otherwise operation continues to block 550. In the embodiment shown in FIG. 5, operation continues to block 550 with a complete focus peak determining data set available for each region of interest ROI(k). However, in other embodiments, the operations of block 550 may begin for a particular region of interest at any convenient time after a sufficient focus peak determining data set is available for that particular region of interest.

At block 550, for each region of interest ROI(k) (e.g., for k=1 to P), the best focus Z height Zp(k) is determined (e.g., estimated as outlined previously) for that ROI(k) based on the focus peak determining data set established by the operations of block 530 for that ROI(k). In some embodiments, each best focus Z height Zp(k) may be stored in the 3D data memory portion 144.

Operation then continues to block 560 where, for each region of interest ROI(k) (e.g., for k=1 to P), corresponding Z-height quality meta-data ZQM(k) is determined for that region of interest ROI(k). The Z-height quality meta-data ZQM(k) may take the form of any convenient Z-height quality meta-data or metric that indicates the reliability or uncertainty of the corresponding estimated Z-height Zp(k)), based on data used to determine the best focus Z height Zp(k) for that region of interest ROI(k).

In one embodiment, the Z-height quality meta-data ZQM (k) may advantageously and conveniently be based on the corresponding peak focus determining data set established by the operations at block 530 for the region of interest ROI(k) (e.g., as outlined with reference to Equations 1 and/or 3 above). However, it will be appreciated that each peak focus determining data set is ultimately based on the underlying image data included in the image stack referred to above. Thus, in various other embodiments, the Z-height quality meta-data ZQM(k) may be derived from data included in the image stack set for the region of interest ROI(k), or other data derived from that image data.

Various methods of determining Z-height quality meta-data ZQM(k) have been outlined previously (e.g., with reference to Equations 1 and/or 3 above). In some embodiments, each of the Z-height quality meta-data ZQM(k) may comprise a Z-height weighting factor ZWF(k) determined for that ROI(k) based on the Z-height quality meta-data ZQM(k) determined at block 560 for that ROI(k) (e.g., as outlined with reference to Equation 3). It will be appreciated based on previous descriptions of Z-height quality meta-data and/or weighting factors that in some embodiments the Z-height quality meta-data may comprising a form that is directly usable as a weighting factor in subsequent surface fitting operations, and in other embodiments such weighting factor may be established during surface fitting operations based on other forms of stored Z-height quality meta-data.

Operation then continues to block 570 where for each ROI(k), the Z-height quality meta-data ZQM(k) is associated with the corresponding best focus Z height Zp(k) for that ROI(k) such that the Z-height quality meta-data ZQM(k) are usable to establish Z-height quality weighting factors ZWK(k) that are associated with the corresponding best focus Z heights Zp(k), in subsequent operations that fit a workpiece surface representation to a plurality of the best focus Z heights Zp(k).

For example, in some embodiments, the Z-height quality meta-data ZQM(k) are stored in the Z-height quality data memory portion 144a in association with their corresponding best focus Z heights Zp(k). In other embodiments, the Z-height quality meta-data ZQM(k) are transferred or applied directly to surface representation fitting operations (e.g., two-dimensional "profile" fitting operations or three-dimensional point cloud fitting operations) in association with their corresponding best focus Z heights Zp(k). As previously indicated, in some embodiments, the Z-height quality meta-data ZQM(k) may comprise or be identical with Z-height quality weighting factors ZWK(k), which may be directly used as weighting factors in subsequent surface representation fitting operations. After block 570, the routine ends.

FIGS. 6A-6D are diagrams illustrating various features of one embodiment of an autofocus tool user interface including parameters related to determining Z-height quality meta-data or metrics. In particular, FIGS. 6A-6D are diagrams illustrating various features of one embodiment of an autofocus parameter dialog box, the tabbed autofocus parameter dialog box 600 that includes user-selectable tabbed portions 610a, 610b, 610c, and 610d. For all the tabbed portions 610a-610d, the Defaults button at the bottom restores the entries on the tabbed portions 610b, 610c, and 610d to their default values, the OK button accepts the current parameters and closes the autofocus parameter dialog box 600, and the Cancel button returns all parameters to their state before the current editing sequence began and closes the dialog box 600.

Figure 6A:
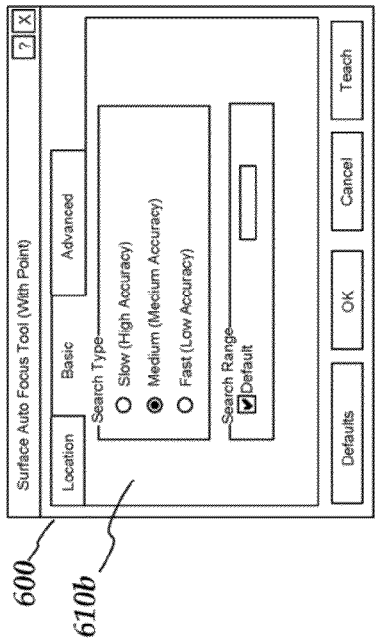
FIGS. 6A-6D are diagrams illustrating various features of one embodiment of an autofocus tool user interface including parameters related to determining Z-height quality metrics.
Figure 7:
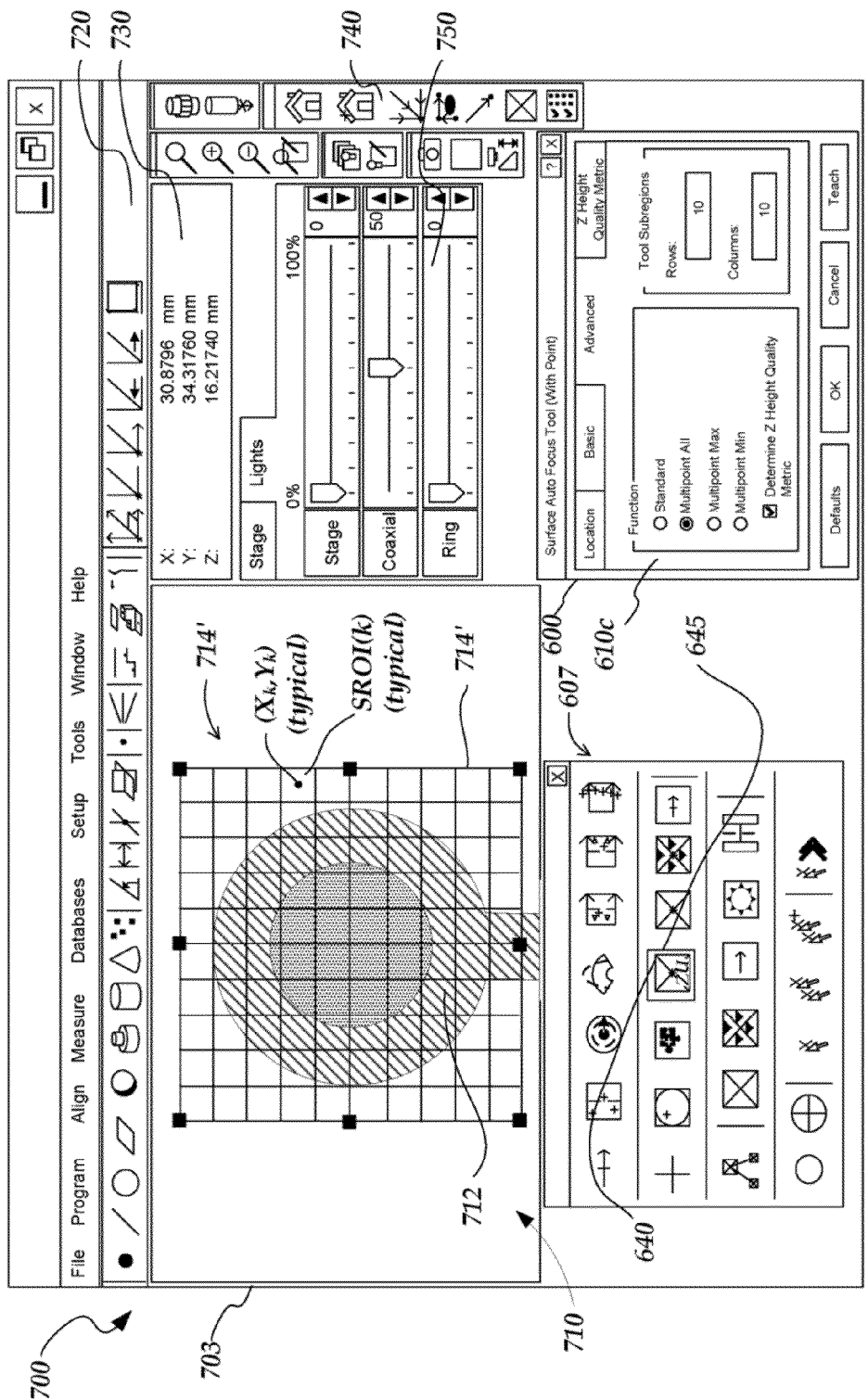
FIG. 7 is a diagram illustrating one embodiment of a machine vision inspection system user interface display including various features associated with an autofocus tool that provides respective Z-height quality metrics associated with respective Z heights.

FIG. 6A illustrates the tabbed portion 610a that may reflect the X and Y center coordinates as well as the width (W), height (H), and angular orientation (not shown) of a selected autofocus tool global or single region of interest. These values may be determined by graphical definition of the region of interest (e.g., as shown in FIG. 7), and/or they may be entered directly in the dialog box.

Figure 6B:
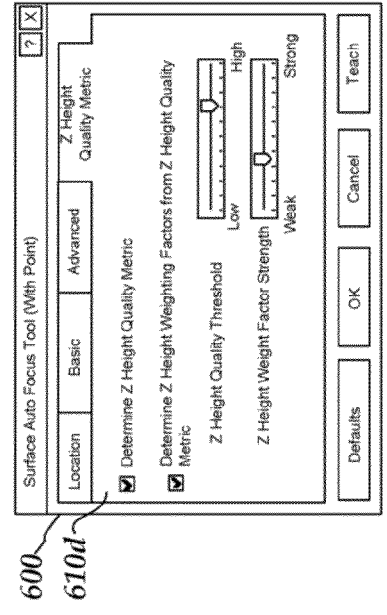

FIG. 6B illustrates the tabbed portion 610b that reflects the autofocus search type to be employed for the selected region of interest. The search type allows the user to select a desired tradeoff between the speed and accuracy of autofocus operations, which may influence the spacing between autofocus images, the number of pixels and data points used to determine a focus curve, and the like. One of the search types may be used as a default search type, unless the user enters a different selection. The tabbed portion 610b may also allow the user to influence the determination of the Z-height search range that is used for autofocus operations (e.g., for the Z range of the images included in an image stack).

In various embodiments, the user may accept and/or select that a default search range be determined and used, or that the search range be based on a nominal (or range midpoint) value entered by the user, or that the search range be based on maximum and minimum values entered by the user. In various embodiments, the autofocus tool may determine a default search range based on operations during manual mode and/or learn mode set-up of the tool. In any case where the search range is not completely defined by user input, autofocus tool operations may determine the Z-height search range based on the current machine optical configuration (e.g., the current depth of field or magnification), and/or workpiece information (e.g., expected surface height variations due to fixturing or fabrication variations, or the like) in order to provide an efficient search range that also includes enough range to allow for robust operation with reasonable variations in the region of interest Z heights during measurement and/or part program execution.

Figure 6C:
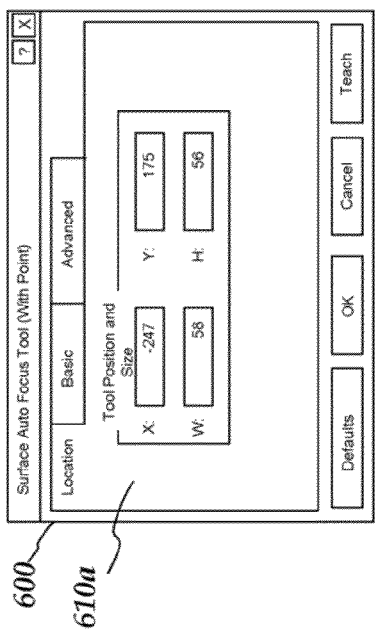

FIG. 6C illustrates the tabbed portion 610c that reflects the type of measurement data the autofocus tool provides for the selected global of single region of interest. The embodiment shown in FIG. 6C allows the user to select one of four measurement data types. The "Standard" selection may return a single Z height for the region of interest. The "Multi-point" selection may automatically provide a Z-height value for a number of sub-regions (e.g., ROI(k) that have representative x-y coordinate locations) within the global region of interest indicated in the tabbed portion 610a. The "Multi-point Max" and "Multi-point Min" selections may automatically provide the maximum and/or minimum Z-height values within the sub-regions.

When a "Multi-point" selection is entered, the number of sub-regions and their representative x-y coordinate locations may be determined (relative to the global region of interest location and extents) based on the number of sub-region rows and columns indicated in the "Tool Subregions" parameter boxes. The user may also select the "Determine Z-height Quality Metric," which will configure the associated autofocus tool or tool mode to implement the operations of the Z-height quality determining portion 143q to determine a Z-height quality metric associated with the best focus Z-height for each region or sub-region (e.g., as outlined with reference to the operations of the routine 500, in some embodiments.

Figure 6D:
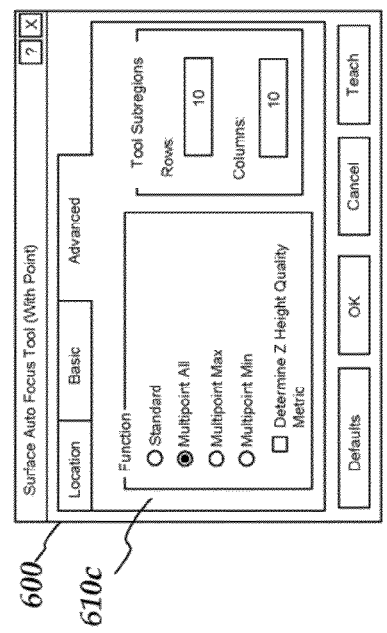

FIG. 6D illustrates the tabbed portion 610d that reflects parameters that may be used in configuring the operations that determine a Z-height quality metric for various regions or sub-regions of interest. The embodiment shown in FIG. 6D includes a "Determine Z-height Quality Metric" check box, which may be slaved to and/or override the corresponding check box in the tabbed portion 610c. The tabbed portion 610d may also include a selection that transforms raw Z-height quality metrics to more versatile or customized Z-height quality weighting factors (e.g., as previously outlined in association with Equation 3).

For example, checking the "Determine Z-Height Weighting Factors from Z-Height Quality" checkbox may implement Equation 3 in some embodiments, and the Z-Height Quality Threshold slider may be used to adjust the parameter "T", and the Z-Height Weight Factor Strength slider may be used to adjust the parameter "$\beta$" in such embodiments. However, it will be appreciated that the tabbed portions 610c and 610d are exemplary only, and not limiting. More generally, they may be adapted as needed to support any desired implementation that falls within the scope of this disclosure.

FIG. 7 is a diagram illustrating one embodiment of a machine vision inspection system user interface display 700 including various features associated with an autofocus tool that provides respective Z-height quality metrics associated with respective Z heights. In the exemplary state shown in FIG. 7, the user interface display 700 includes a field of view window 703 that displays a workpiece image 710. The user interface 700 also include various measurement and/or operation selection bars such as the selection bars 720 and 740, a real-time X-Y-Z (position) coordinate window 730, and a light control window 750.

The field of view window 703 includes an exemplary multipoint autofocus tool widget 714 and a corresponding global region of interest 714' defined by the outer boundaries of the widget 714 and superimposed upon a current workpiece feature 712 to be inspected. As shown in FIG. 7, the global region of interest 714' is subdivided into 10×10 sub-regions of interest SROI(k) (e.g., for k=1 to 100). Each sub-region SROI(k) may be associated with a representative central location ($X_k$, $Y_k$), and may include an area corresponding to a number of pixel rows and a number of pixel columns. When a best focus Z height $Zp_k$ is determined based on a sub-region of interest (e.g., as outlined previously), the point cloud element corresponding to that sub-region of interest may be represented by the three-dimensional coordinates ($X_k$, $Y_k$, $Zp_k$).

In various embodiments, the representative locations of the sub-regions may be spaced apart by several pixels or as little as one pixel. Thus, in some such embodiments, the pixel areas used to determine a best focus Z height $Zp_k$ for each sub-region may partially overlap one another. In some implementations, the area of each sub-region may be relatively small (e.g., 9×9 pixels, 7×7 pixels, 3×3 pixels, 3×5 pixels, etc.). It will be appreciated that using Z-height quality metrics in a method according to this disclosure is particularly valuable in association with small focus regions of interest, which tend to produce "focus signals" or focus metrics that may include a relatively large noise component.

In various embodiments, the user may select an autofocus tool or mode that includes determining a Z-height quality metric (or Z-height uncertainty) by selecting the "Z-Uncertainty autofocus tool" button 640 from a selection bar 607 that displays various alternative tool and/or mode selection buttons. The tool selection bar 607 may indicate that the Z-uncertainty autofocus tool or mode is active via an "active" box 645 around the Z-uncertainty autofocus tool or mode button 640. Upon such a selection, in one embodiment, the user interface may automatically display an autofocus parameter dialog box, such as the previously described parameter dialog box 600 shown in FIG. 7, for configuring the various parameters of the selected autofocus tool.

In one embodiment, the widget 714 may be automatically displayed in the user interface to allow a user to graphically define the region of interest 714' for that instance of the autofocus tool (e.g., by dragging the square handles located on the border of the widget 714 using a computer mouse and screen cursor). It will be appreciated that the 10×10 sub-regions shown for the widget 714 correspond to the particular "Multipoint" parameter settings shown in the tabbed portion 610c in FIG. 7.

It will be appreciated that while the increase in accuracy of the surface shape determined by relying at least partially on the Z-height quality metric operations outlined above may be relatively small in some instances (e.g., sub-micron improvement for certain magnifications), improvements in the robustness or speed of the surface shape determining operations may be significant. Furthermore, even small improvements in the accuracy and/or robustness of point cloud fitting operations are important in numerous applications and may in particular assist with the measurement of certain pathological surfaces, and in all cases, greater accuracy is generally more desirable when performing precision measurement operations.

While various preferred embodiments have been illustrated and described, numerous variations in the illustrated and described arrangements of features and sequences of operations will be apparent to one skilled in the art based on this disclosure. Thus, it will be appreciated that various changes can be made therein without departing from the spirit and scope of the disclosure.

The embodiments of the invention in which an exclusive property or privilege is claimed are defined as follows:

1. A method for operating a precision machine vision inspection system to determine Z-height quality meta-data associated with focus-based Z-height measurements on a workpiece, the precision machine vision inspection system comprising an imaging portion, a focusing portion, and a control portion comprising an image processor, the method comprising:
   (a) defining at least one focus region of interest on the workpiece for which Z heights and Z-height quality meta-data are to be determined;
   (b) acquiring an image stack set of images of the at least one focus region of interest, the image stack set comprising member images acquired at corresponding known Z heights throughout a focus range;
   (c) determining a focus peak determining data set for the at least one focus region of interest based on the image stack set, wherein the focus peak determining data set comprises focus metrics based on the at least one focus region of interest in the member images;
   (d) determining a best focus Z height for the at least one focus region of interest, based on the focus peak determining data set for the at least one focus region of interest;
   (e) determining Z-height quality meta-data corresponding to the best focus Z height for the at least one focus region of interest, wherein the Z-height quality meta-data is based on data used to determine the best focus Z height for the at least one focus region of interest, and the Z-height quality meta-data is indicative of at least one of the reliability and the uncertainty of the corresponding best focus Z height for the at least one focus region of interest; and
   (f) associating the Z-height quality meta-data for the at least one focus region of interest with the corresponding best focus Z height for the at least one focus region of interest, such that the Z-height quality meta-data for the at least one focus region of interest are usable to establish Z-height quality weighting factors that are used in association with the corresponding best focus Z height for the at least one focus region of interest in subsequent operations that fit a workpiece surface representation to a plurality of the best focus Z heights.

2. The method of claim 1, wherein the precision machine vision inspection system comprises a graphical user interface and an autofocus video tool and at least the steps (b), (c), (d), and (e) are performed automatically by operations associated with the autofocus video tool.

3. The method of claim 2, wherein the method comprises a user performing at least one of the operations of selecting the autofocus video tool using the graphical user interface and configuring operating parameters of the autofocus video tool using the graphical user interface.

4. The method of claim 3, wherein the autofocus video tool is a multi-point autofocus tool that defines a plurality of sub-regions of interest within a global region of interest defined for the multi-point autofocus tool, and each at least one focus region of interest comprises a sub-region of interest of the multi-point autofocus tool.

5. The method of claim 3, wherein a plurality of the sub-regions of interest have an area that is at most 9×9 pixels.

6. The method of claim 1, wherein in step (c) for each focus region of interest the corresponding focus peak determining data set comprises respective focus metrics based on that focus region of interest in respective member images, and the corresponding known Z heights for the respective member images.

7. The method of claim 1, wherein in step (e) determining the Z-height quality meta-data comprises determining a representative noise level indicated by the data used to determine the best focus Z height for the at least one focus region of interest.

8. The method of claim 7, wherein in step (e) determining the Z-height quality meta-data comprises determining a relationship between a representative peak height indicated by the focus peak determining data set and a representative noise level indicated by the focus peak determining data set.

9. The method of claim 8, wherein determining the relationship between the representative peak height and the representative noise level comprises determining at least one of a ratio and a quotient including the representative peak height and the representative noise level.

10. The method of claim 1, wherein in step (f) associating the Z-height quality meta-data for the at least one focus region of interest with the corresponding best focus Z height for the at least one focus region of interest comprises storing the Z-height quality meta-data for a focus region of interest in association with the corresponding best focus Z height for that focus region of interest.

11. The method of claim 1, wherein in step (f) determining the Z-height quality meta-data for the at least one focus region of interest comprises determining the Z-height quality meta-data in the form of at least one Z-height quality weighting factor that is useable in association with the corresponding best focus Z height for the at least one focus region of interest in subsequent operations that fit a workpiece surface representation to a plurality of the best focus Z heights.

12. The method of claim 1, further comprising:
(g) using the Z-height quality meta-data to establish a plurality of Z-height quality weighting factors corresponding to a plurality of best focus Z heights for a plurality of focus regions of interest, and performing fitting operations that fit a workpiece surface representation to the plurality of the best focus Z heights for the plurality of focus regions of interest, including applying the Z-height quality weighting factors during the fitting operations.

13. The method of claim 12, wherein in step (g) performing the fitting operations further includes determining and applying weighting factors that are governed by geometrical relationships based on the best focus Z heights for the plurality of focus regions of interest.

14. The method of claim 1, further comprising:
using the Z-height quality meta-data to identify invalid best focus Z heights for corresponding focus regions of interest, based on at least one of (i) comparing the Z-height quality meta-data to a Z-height quality meta-data threshold value, and (ii) identifying statistically determined Z-height quality meta-data outliers.

15. A precision machine vision inspection system usable to determine Z-height quality meta-data associated with focus-based Z-height measurements on a workpiece, the precision machine vision inspection system comprising an imaging portion, a focusing portion, and a control portion comprising an image processor, the control portion configured such that the precision machine vision inspection system performs a set of operations comprising:

(a) defining at least one focus region of interest on the workpiece for which Z heights and Z-height quality meta-data are to be determined;
(b) acquiring an image stack set of images of the at least one focus region of interest, the image stack set comprising member images acquired at corresponding known Z heights throughout a focus range;
(c) determining a focus peak determining data set for the at least one focus region of interest based on the image stack set, wherein the focus peak determining data set comprises focus metrics based on the at least one focus region of interest in the member images;
(d) determining a best focus Z height for the at least one focus region of interest, based on the focus peak determining data set for the at least one focus region of interest;
(e) determining Z-height quality meta-data corresponding to the best focus Z height for the at least one focus region of interest, wherein the Z-height quality meta-data is based on data used to determine the best focus Z height for the at least one focus region of interest, and the Z-height quality meta-data is indicative of at least one of the reliability and the uncertainty of the corresponding best focus Z height for the at least one focus region of interest; and
(f) associating the Z-height quality meta-data for the at least one focus region of interest with the corresponding best focus Z height for the at least one focus region of interest, such that the Z-height quality meta-data for the at least one focus region of interest are usable to establish Z-height quality weighting factors that are used in association with the corresponding best focus Z height for the at least one focus region of interest in subsequent operations that fit a workpiece surface representation to a plurality of the best focus Z heights.

16. The precision machine vision inspection system of claim 15, wherein the precision machine vision inspection system further comprises a graphical user interface and an autofocus video tool, and at least the operations (b), (c), (d), and (e) are automatically performed operations associated with the autofocus video tool.

17. The precision machine vision inspection system of claim 16, configured such that a user can operate the precision machine vision inspection system to perform at least one of the operations of selecting the autofocus video tool using the graphical user interface and configuring operating parameters of the autofocus video tool using the graphical user interface.

18. The precision machine vision inspection system of claim 16, wherein the autofocus video tool is a multi-point autofocus tool that defines a plurality of sub-regions of interest within a global region of interest defined for the multi-point autofocus tool, and each at least one focus region of interest comprises a sub-region of interest of the multi-point autofocus tool.

19. The precision machine vision inspection system of claim 15, wherein in step (e), determining the Z-height quality meta-data for the at least one focus region of interest comprises determining the Z-height quality meta-data in the form of at least one Z-height quality weighting factor that is useable in association with the corresponding best focus Z height for the at least one focus region of interest in subsequent operations that fit a workpiece surface representation to a plurality of the best focus Z heights.

20. The precision machine vision inspection system of claim 15, wherein the control portion is further configured such that the precision machine vision inspection system performs a further set of operations comprising:

(g) using the Z-height quality meta-data to establish a plurality of Z-height quality weighting factors corresponding to a plurality of best focus Z heights for a plurality of focus regions of interest, and performing fitting operations that fit a workpiece surface representation to the plurality of the best focus Z heights for the plurality of focus regions of interest, including applying the Z-height quality weighting factors during the fitting operations.

* * * * *